United States Patent [19]
Harpole et al.

[11] Patent Number: 5,259,413
[45] Date of Patent: Nov. 9, 1993

[54] STEERING CONTROL VALVE WITH CONTOURED CONTROL SURFACES

[75] Inventors: George M. Harpole, San Pedro; Hermann W. Behrens, Rancho Palos Verdes; Michael F. Wolff, Torrance; Jane M. Lin, Rancho Palos Verdes, all of Calif.

[73] Assignee: TRW Inc., Lyndhurst, Ohio

[21] Appl. No.: 936,135

[22] Filed: Aug. 27, 1992

[51] Int. Cl.⁵ ............... F15B 13/04; F16K 11/076
[52] U.S. Cl. ................ 137/625.24; 137/625.21; 91/375 A
[58] Field of Search ........... 91/375 A; 137/625.21, 137/625.24

[56] References Cited

U.S. PATENT DOCUMENTS

| | | | |
|---|---|---|---|
| 3,022,772 | 2/1962 | Zeigler et al. | 121/41 |
| 4,300,594 | 11/1981 | Bocardit | 137/625.21 |
| 4,335,749 | 6/1982 | Wolfgang | 137/625.22 |
| 4,445,422 | 5/1984 | Bishop | 137/625.24 |
| 4,460,016 | 7/1984 | Kyosuke et al. | 137/625.24 |
| 4,471,808 | 9/1984 | Thomsen et al. | 251/209 |
| 4,577,660 | 3/1986 | Haga et al. | 91/375 A |
| 4,579,040 | 4/1986 | Masuda et al. | 137/625.24 |
| 4,705,132 | 11/1987 | Tsuchiya | 91/375 A |
| 4,771,841 | 9/1988 | Uchida et al. | 180/142 |
| 4,779,646 | 10/1988 | Vincent | 137/625.24 |
| 4,852,462 | 8/1989 | Uchida et al. | 91/375 A |
| 4,924,910 | 5/1990 | Tabata et al. | 137/625.23 |
| 5,133,384 | 7/1992 | Tabata et al. | 91/375 A |

Primary Examiner—A. Michael Chambers
Attorney, Agent, or Firm—Tarolli, Sundheim & Covell

[57] ABSTRACT

A valve for controlling flow of hydraulic fluid. The valve includes a valve sleeve and a valve core. The core is disposed within the sleeve. The core and sleeve are relatively rotatable. Each of said core and sleeve has an axially extending land and an axially extending groove. The core and sleeve have relative rotational positions such that the lands overlap to define a flow gap for flow of hydraulic fluid from the groove in the sleeve to the groove in the core. The flow gap has a minimum cross-sectional flow area adjacent to the groove in the core. The minimum cross-sectional flow area constantly varies as the core and sleeve relatively rotate. The land on the sleeve has a notch immediately adjacent to, and downstream of the minimum cross-sectional flow area which provides an abrupt increase in cross-sectional flow area for suppressing valve noise due to cavitation.

20 Claims, 5 Drawing Sheets

STEERING CONTROL VALVE WITH CONTOURED CONTROL SURFACES

BACKGROUND OF THE INVENTION

The present invention relates to a valve for controlling flow of hydraulic fluid. The valve is used to control the flow of hydraulic fluid to a power steering motor.

A known power steering control valve for controlling flow of hydraulic fluid to a power steering motor includes a hollow valve sleeve and a valve core. The core is positioned within the sleeve. The core and sleeve are relatively rotatable. Each of the core and sleeve has a plurality of lands and grooves.

When the spool and sleeve are in a neutral position fluid is communicated to opposite chambers of the power steering motor at equal pressures. When the core and sleeve are relatively rotated from the neutral position, fluid flow is variably restricted. Restriction of the fluid flow causes pressurized fluid to be delivered to one of two chambers of a hydraulic power assist motor to cause motor actuation.

The restriction is provided by lands on the core and sleeve which radially overlap to define narrow flow gaps. Variation of the flow gap, and the amount of restriction, is provided by end surface segments of the lands which are formed such that varied amounts of relative rotation between the core and sleeve cause the overlapping end surface segments to be positioned at varying distances apart. Due to high volume of hydraulic fluid flow and pressure differential changes (drops) as the hydraulic fluid flows through the flow gaps, the control valve creates noise. The noise includes noise due to cavitation created by fluid flowing through a gradually expanding flow area.

SUMMARY OF THE INVENTION

The present invention is directed to a valve for controlling flow of hydraulic fluid. The valve includes a valve sleeve which has a hollow interior. The valve also includes a valve core which is disposed within the valve sleeve. The valve core and the valve sleeve are relatively rotatable about a common axis.

The valve sleeve and valve core each have an axially extending land and an axially extending groove. Each land has an axially extending end face. Further, the land on the valve sleeve has a corner portion adjacent to the groove in the valve sleeve. The valve sleeve and valve core have relatively rotated positions such that the end faces of the lands overlap circumferentially and radially to define a flow gap having a cross-sectional flow area. The flow gap is varied to control the flow of hydraulic fluid from the groove in the valve sleeve to the groove in the valve core.

The flow gap has a minimum cross-sectional flow area defined by the axially extending land end faces. The minimum cross-sectional flow area is located at the corner portion of the land on the valve sleeve and immediately adjacent to the groove in the valve sleeve for all relatively rotated positions of said valve sleeve and valve core. The minimum cross-sectional flow area is constantly varied as the valve core and valve sleeve are relatively rotated. The land on the valve sleeve has a axially extending notch located on the axially extending land end face. The notch is located immediately adjacent to and downstream of the minimum cross-sectional flow area. The notch provides an abrupt increase in cross-sectional flow area immediately adjacent to and downstream of the minimum cross-sectional flow area for suppressing valve noise due to cavitation.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF PREFERRED EMBODIMENT

Figure 1:
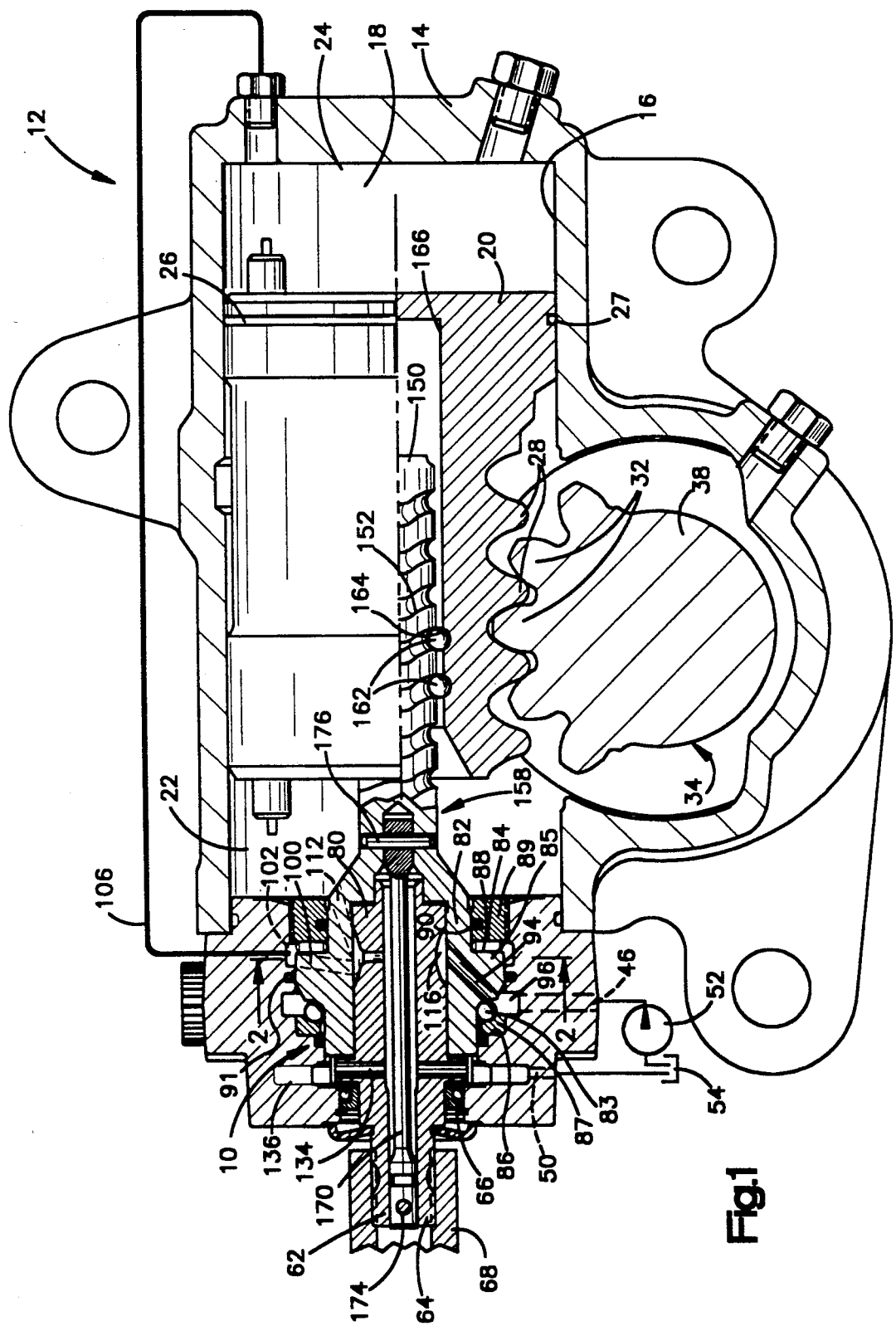
FIG. 1 is a longitudinal cross-sectional view of a power steering gear with a valve which embodies the present invention.

The fluid control valve (FIG. 1) of the present invention may be used to control fluid flow associated with mechanisms of a variety of constructions and uses. Preferably, the control valve 10 is utilized in a power steering gear 12 for turning dirigible wheels (not shown) of a vehicle (not shown) to effect steering of the vehicle. The preferred power steering gear 12 is a TAS Integral Power Steering Gear manufactured and marketed by TRW Inc., Ross Gear Division of Lafayette, Indiana, and identified as TAS40, TAS55 or TAS65. The power steering gear 12 includes a housing 14 having an inner cylindrical surface 16 defining a chamber 18. A piston 20 divides the chamber 18 into opposite chamber portions 22 and 24 located at opposite ends of the piston 20. An O-ring 26 carried in a groove 27 in the piston 20 provides a fluid seal between the chamber portions 22 and 24.

A series of rack teeth 28 are formed on the periphery of the piston 20. The rack teeth 28 mesh with teeth 32 formed on a sector gear 34. The sector gear 34 is fixed on an output shaft 38 which extends outwardly from the steering gear 12 through an opening (not shown) in the housing 14. The output shaft 38 is typically connected to a Pitman arm (not shown) which in turn is connected to a mechanical steering linkage (not shown) of the vehicle. Thus, as the piston 20 moves in the chamber 18, the output shaft 38 is rotated to operate the steering linkage as will be understood by those skilled in the art.

The housing 14 includes a fluid inlet port 46 and a fluid return port 50. The inlet port 46 and return port 50 are adapted to be connected in fluid communication with hydraulic circuitry (schematically illustrated) including a power steering pump 52. The control valve 10 directs pressurized fluid from the inlet port 46 to one or the other of the chamber portions 22 and 24. Fluid from the other of the chamber portions 22 and 24 is simultaneously directed by the control valve 10 to the return port 50 which is connected with a power steering pump fluid reservoir 54. The control valve is actuated by a manually rotatable shaft 62. The shaft 62 is supported for rotation relative to the housing 14 via bearing member 66. An outer end portion 64 of the shaft 62 is splined for receiving a portion of a shaft 68 thereon. The shaft 68 is connected with a steering wheel (not shown) which is manually turned by the operator of the vehicle to effect steering of the vehicle.

Figure 2:
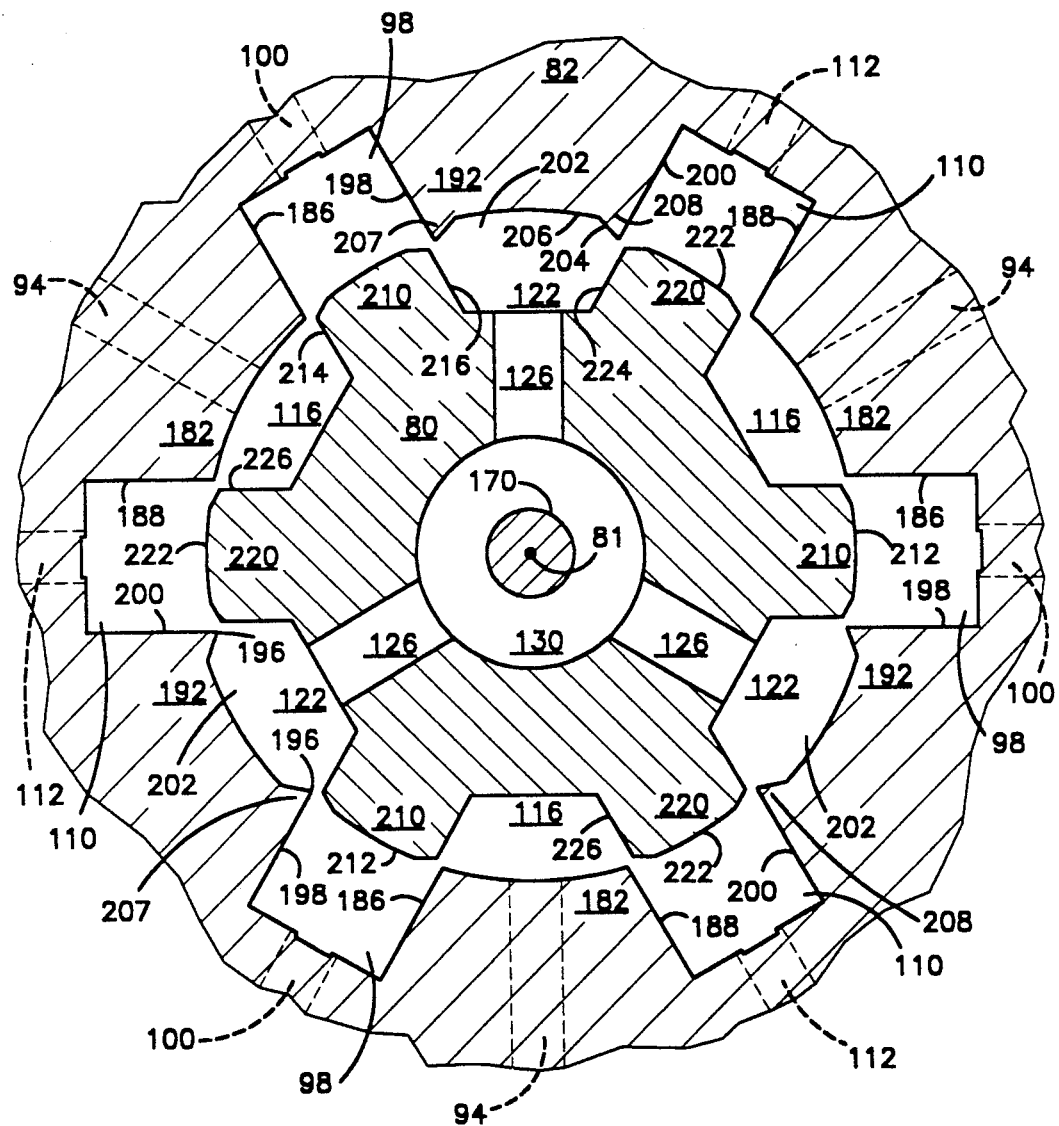
FIG. 2 is a partial cross-sectional view of the valve taken approximately along line 2—2 of FIG. 1.

The control valve 10 includes a valve core part 80 and a valve sleeve part 82. The valve core part 80 is located coaxially within the valve sleeve part 82. The valve core part 80 is rotatable relative to the valve sleeve part 82 about a common axis 81 (FIG. 2). The valve sleeve part 82 (FIG. 1) is supported for rotation by bearings 83 and 84 located between the valve sleeve part 82 and the housing 14. The bearing 83 is located between an annular projecting portion 85 of the valve sleeve part 82 and a radial wall 86 of the housing 14. The bearing 83 is a ball bearing. Also, a seal ring 87 is located between the outer surface of the valve sleeve part 82 and the housing 14.

The bearing 84 is a thrust bearing and is located between a radial surface 88 of the annular projecting portion 85 of the valve sleeve part 82 and a retaining nut 89. The nut 89 is threaded into the housing 14 and holds the control valve 10 in position in the housing 14. A seal ring 90 is located between the nut 89 and an outer surface of the valve sleeve part 82. Another seal 91 is disposed in a groove in the housing 14.

The valve sleeve part 82 (FIG. 2) has three radially directed passages 94 extending from its outer circumference to its inner circumference. The passages 94 are spaced 120° apart about the valve sleeve 82. The passages 94 communicate with an annulus 96 (FIG. 1) in the housing 14. The annulus 96, in turn, is connected with the inlet port 46, and is thus subjected to the fluid pressure from the power steering pump 52.

The valve sleeve part 82 has on its inner surface three axially extending grooves 98 (FIG. 2). The three grooves 98 are equally spaced around the inner surface of the valve sleeve part 82. Each of the groove 98 communicate with a respective radially extending passage 100. The passages 100 are spaced 120° apart about the valve sleeve part 82. The passages 100 (FIG. 1 shows only one passage 100, in phantom) communicate with an annulus 102 in the housing 14. The annulus 102 communicates with a suitable housing passage 106 which, in turn, communicates with the chamber portion 24.

The valve sleeve part 82 (FIG. 2) includes three axially extending grooves 110 on the inner surface thereof. The grooves 110 are equally spaced about the inner surface of the valve sleeve part 82. Each of the grooves 110 communicate with a respective passage 112. The passages 112 are spaced 120° apart about the valve sleeve part 82. The passages 112 (FIG. 1 shows only one passage 112, in phantom) communicate with the chamber portion 22.

The valve core part 80 has an elongated cylindrical configuration and is integrally formed as one piece with the shaft 62. The valve core part 80 has three axially extending grooves 116 (FIG. 2) in its outer circumference. The grooves 116 are spaced 120° apart about the outer circumference of the valve core part 80 and communicate with the passages 94 in the valve sleeve part 82. The extent of the grooves 116 around the outer circumference of the valve core part 80 is such that each of the grooves 116 communicates equally with respective grooves 98 and 110 when the valve core part 80 is in a centered or neutral position relative to the valve sleeve part 82 (as shown in FIG. 2).

Also equally spaced about the outer circumference of the valve core part 80 and located intermediate the grooves 116 are axially extending grooves 122. Each of the grooves 122 communicate with a respective passage 126 which extends from each groove 122 into an internal passage 130 of the valve core part 80. The internal passage 130 of the valve core part 80 also communicates with a plurality (four) of radially extending passages 134 (FIG. 1) which extend through the valve core part 82. The radially extending passages 134 communicate with an annulus 136 in the housing 14. The annulus 136, in turn, communicates with the return port 50 in the housing 14.

The valve sleeve part 82 of the steering gear 12 is integrally formed with a follow-up member 150 which has a screw thread portion 152 formed in its outer periphery. The valve sleeve part 82 and the follow-up member 150 form an integral one-piece unit 158. A plurality of balls 162 are located in the screw thread portion 152. The balls 162 are also located in an internally threaded portion 164 formed in a bore 166 of the piston 20. Axial movement of the piston 20 corresponds to rotation of the follow-up member 150, as is known.

A torsion spring 170 is connected between the input shaft 62 and the follow-up member 150 by pins 174 and 176, respectively. During a steering maneuver, the valve core part 80 is rotated relative to the valve sleeve part 82, away from the neutral position, as is known. Thus, when the valve core part 80 is rotated relative to the valve sleeve part 82, the piston 20 moves axially. When the steering maneuver is terminated, the one-piece unit 158, and thus the valve sleeve part 82, will rotate relative to the valve core part 80 and return the valve parts 80 and 82 to the neutral position via the bias of the torsion spring 170.

The valve sleeve part 82 of the control valve 10 includes three axially extending lands 182 (FIG. 2) positioned opposite the grooves 116 of the valve core part 80. The lands 182 each include an axially extending end face surface 184. An associated one of the passages 94 extends through each land 182 and through a respective one of the end face surface 184 to communicate with a respective one of the grooves 116. Each of the lands 182 includes an axially extending side surface 186 which partially defines a respective one of the grooves 98. Each of the lands 182 includes an axially extending side face surface 188 which partially defines a respective one of the grooves 110.

Figure 4:
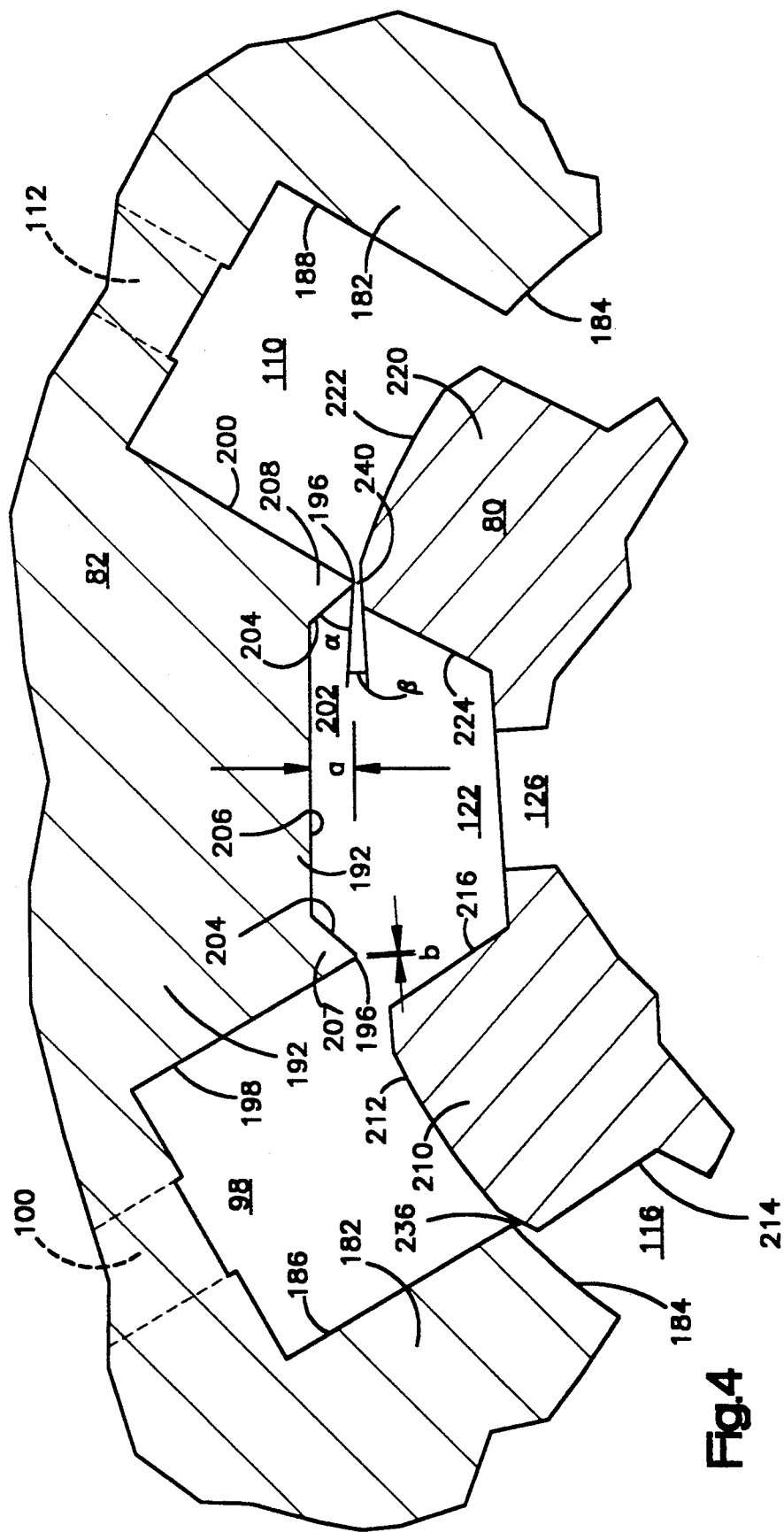
FIG. 4 is an enlarged portion of the view shown in FIG. 3 showing the surface profiles of the valve members.

The valve sleeve part 82 includes three axially extending lands 192 positioned opposite the groove 122 of the valve core part 180. The lands 192 each include axially extending end face surface segments 196. The lands 192 each include axially extending side faces surfaces 198 and 200. The side face surfaces 198 and 200 partially define the grooves 98 and 110, respectively. The lands 192 each have an axially extending notch 202. Each notch 202 is defined by axially extending sloped surfaces 204 and an axially extending bottom surface 206. An angle α (FIG. 4) which subtends a respective one of the end face surface segments 196 and a respective one of the sloped surfaces 204 is at least 12° and is preferably approximately 45°. Each notch 202 (FIG. 2) is substantially as long as the grooves 98 and 110. Each land 192 has a width which is slightly greater than a respective one of the notches 202. Each notch 202 is positioned opposite a respective one of the grooves 122.

The side face surface 198 and one of the end face surface segments 196 partially define a first corner portion 207 on each of the lands 192, which is positioned adjacent to a respective one of the grooves 98. The side face surface 200 and the other of the end face surface segments 196 partially define a second corner portion 208 on each of the lands 192, which is positioned adjacent to a respective one of the grooves 110. The notch 202 (FIG. 4) has a preferred radial depth "a" of 0.031 inches and each of the end face surface segments 196 has a preferred tangential width "b" of 0.01 inches.

The valve core part 80 (FIG. 2) includes three axially extending lands 210. The lands 210 are positioned opposite the grooves 98. Each of the lands 210 has an axially extending end face surface 212. Each of the end face surfaces 212 is chamfered o either side adjacent the grooves 116 and 122, to taper radially inwardly from an arc extending about the axis 81. Each of the lands 210 has an axially extending side face surface 214 which partially defines a respective one of the grooves 116. Each of the lands 210 includes an axially extending side face surface 216 which partially defines a respective one of the grooves 122.

The valve core part 80 includes three axially extending lands 220. Each of the lands 220 has an axially extending end face surface 222. Each of the end face surfaces 222 is chamfered on either side, adjacent to the grooves 116 and 122, to taper radially inwardly from an arc extending about the axis 81. Each of the lands 220 includes an axially extending side face surface 224 which partially defines a respective one of the grooves 122. Each of the lands 220 includes an axially extending side face surface 226 which partially defines a respective one of the grooves 116.

In operation, the amount of fluid flow from the grooves 116 to either the grooves 98 or 110 is dependent upon the proximity of either the lands 210 or 220 to the lands 182, due to relative rotation of the valve core part 80 and the valve sleeve part 82. Further, the amount of fluid flow from either the grooves 98 or 110 to the grooves 122 is dependent upon the proximity of either land 210 or land 220 to the lands 192, due to relative rotation of the valve core part 80 to the valve sleeve part 82.

In the neutral position (FIG. 2) the lands 210 and the lands 220 are spaced at equal distances from the lands 182. Substantially equal amounts of pressurized hydraulic fluid flows from the grooves 116 into both the grooves 98 and the grooves 110. Also, in the neutral position, the lands 210 and the lands 220 are spaced at substantially equal distances from the lands 192. Substantially equal amounts of hydraulic fluid flows from the groove 98 and 110 into the grooves 122. Thus, in the neutral position, the pressures in the chambers 22 and 24 (FIG. 1) are substantially equal. Therefore, the piston 20 is not moved within the chamber 18.

Figure 3:
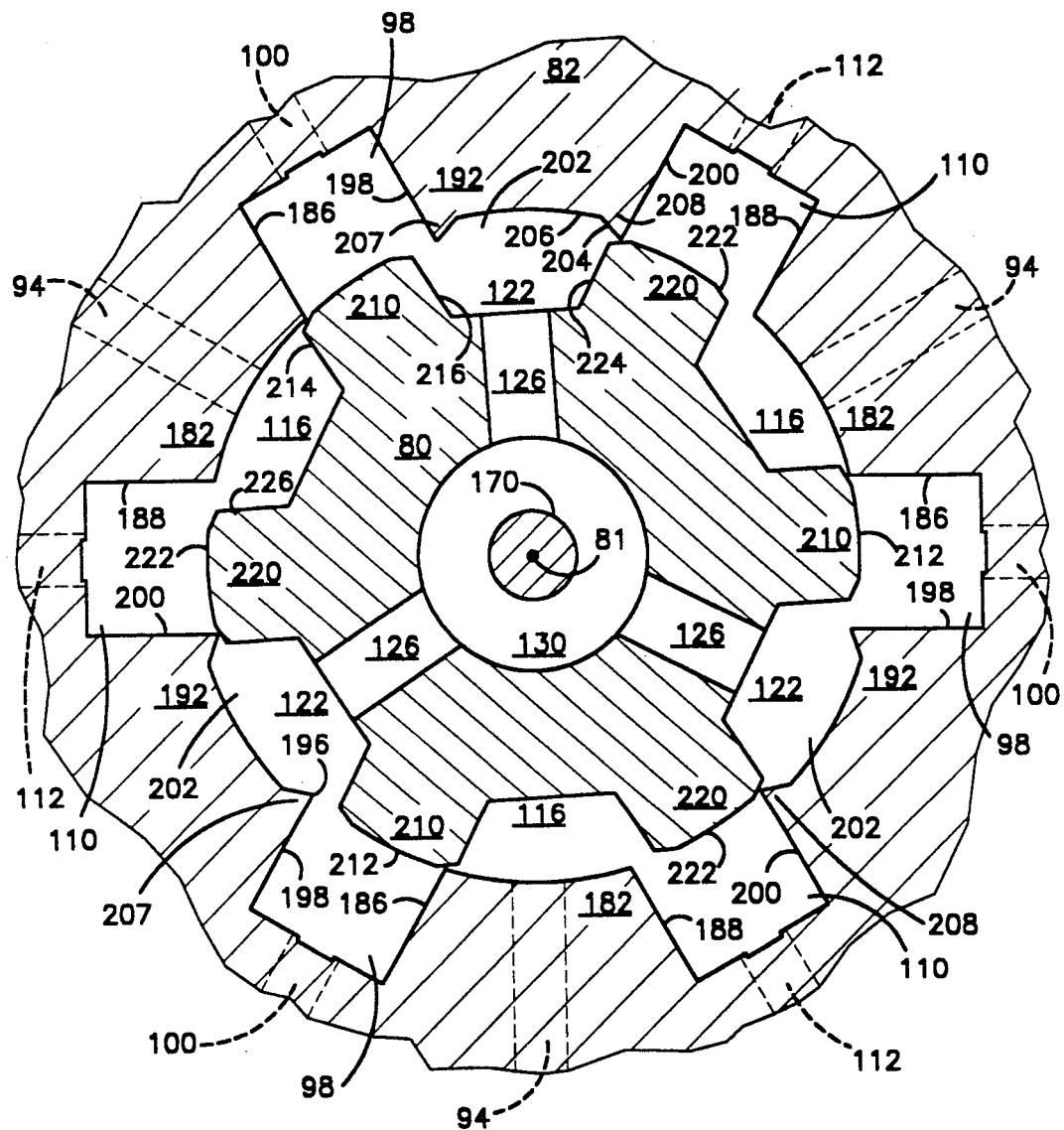
FIG. 3 is a partial cross-sectional view generally similar to FIG. 2, with valve members relatively rotated.

Upon rotation of the steering wheel, the valve core part 80 is rotated relative to the valve sleeve part 82, away from the neutral position. During rotation, resistance to fluid flow is continuously varied. Rotation of the valve core part 80 in a first direction (counterclockwise as shown in FIG. 3) relative to the valve sleeve part 82 provides a corresponding increase or decrease in resistance of fluid flow between the grooves. Pressurized hydraulic fluid from the fluid supply pump 52 (FIG. 1) is directed into the chamber 22. Hydraulic fluid from the chamber 24 is vented to the reservoir 54.

In the rotated position (FIG. 4), the lands 210 partially radially and circumferentially overlap the lands 182 and the lands 220 partially radially and circumferentially overlap the lands 192. The overlapping lands 210 and 182 create flow gaps 236 for hydraulic fluid flowing from the grooves 116 to the grooves 98. The overlapping lands 220 and 192 create flow gaps 240 for hydraulic fluid flowing from the grooves 110 to the grooves 122. The overlapping lands 210 and 182 and the overlapping lands 220 and 192 provide increased restriction to the flow of hydraulic fluid. Simultaneously, in the relatively rotated position, the lands 220 are spaced a greater distance from the lands 182 and the lands 210 are spaced a greater distance from the lands 192 than in the neutral position. The spacing of the lands 220 relative to the lands 182 and the spacing of the lands 210 relative to the lands 192 provide reduced restriction of the flow of hydraulic fluid.

Each flow gap 236 has a cross-sectional flow area defined by the end face surface 184 of on of the lands 182 and the chamfered end face surface 212 of one of the lands 210. The cross-sectional flow area of each flow gap 236 for flow of hydraulic fluid from the grooves 116 to the grooves 98 gradually decreases to a minimum cross sectional flow area immediately adjacent to the groove 98. The minimum cross-sectional flow area being defined by the terminus point of the end face surface 184 and the chamfered end face surface 212.

Each flow gap 240 has a cross-sectional flow area defined by the end face surface segment 196, the sloped surface 204 and the chamfered end face surface 222 on the land 220. An angle $\beta$ which subtends the end face surface segment 196 and a radially overlapping portion of the chamfered end face surface 222 is less than 7°. An angle $(\alpha + \beta)$ which subtends the sloped surface 204 and a radially overlapping portion of the chamfered end face surface 222 is at least 12° and preferably greater than 45°. The cross-sectional flow area of the flow gap 240 has a minimum cross-sectional flow area defined by the end face surface segment 196 on the land 192. The minimum cross-sectional flow area is immediately adjacent to a respective one of the grooves 110. The cross-sectional flow area of the flow gap 240 has an abruptly increasing cross-sectional flow area defined by the sloped surface 204. The sloped surfaces 204 of the notch 202 is immediately adjacent to and downstream of the minimum cross-sectional flow area. Thus, for hydraulic fluid flowing from the grooves 110 toward the grooves 122, the flow gaps 240 have an abruptly increasing cross-sectional flow area downstream of the minimum cross-sectional flow area. Further, the minimum cross-sectional flow area of the flow gap 240 constantly varies as the valve core part 80 and the valve sleeve part 82 are relatively rotated.

Upon rotation of the valve core part 80 in a second direction (clockwise, not shown) relative to the valve sleeve part 82, there is a corollary restriction of flow of hydraulic fluid between the grooves. With the valve core part 80 and the valve sleeve part 82 in such a relative rotated position, the lands 220 radially overlap the lands 182 and the lands 210 radially overlap the lands 192. Thus, associated flow gaps are established between the lands 182 and 220 and the lands 192 and 210. Thus, the flow of hydraulic fluid from the grooves 116 to the grooves 110 is restricted. Also, the flow of hydraulic fluid from the grooves 98 to the grooves 122 is restricted. Thus, pressurized hydraulic fluid from the fluid supply pump 52 (FIG. 1) is directed into the chamber 24. Hydraulic fluid from the chamber 22 is vented to the reservoir 54.

Figure 5:
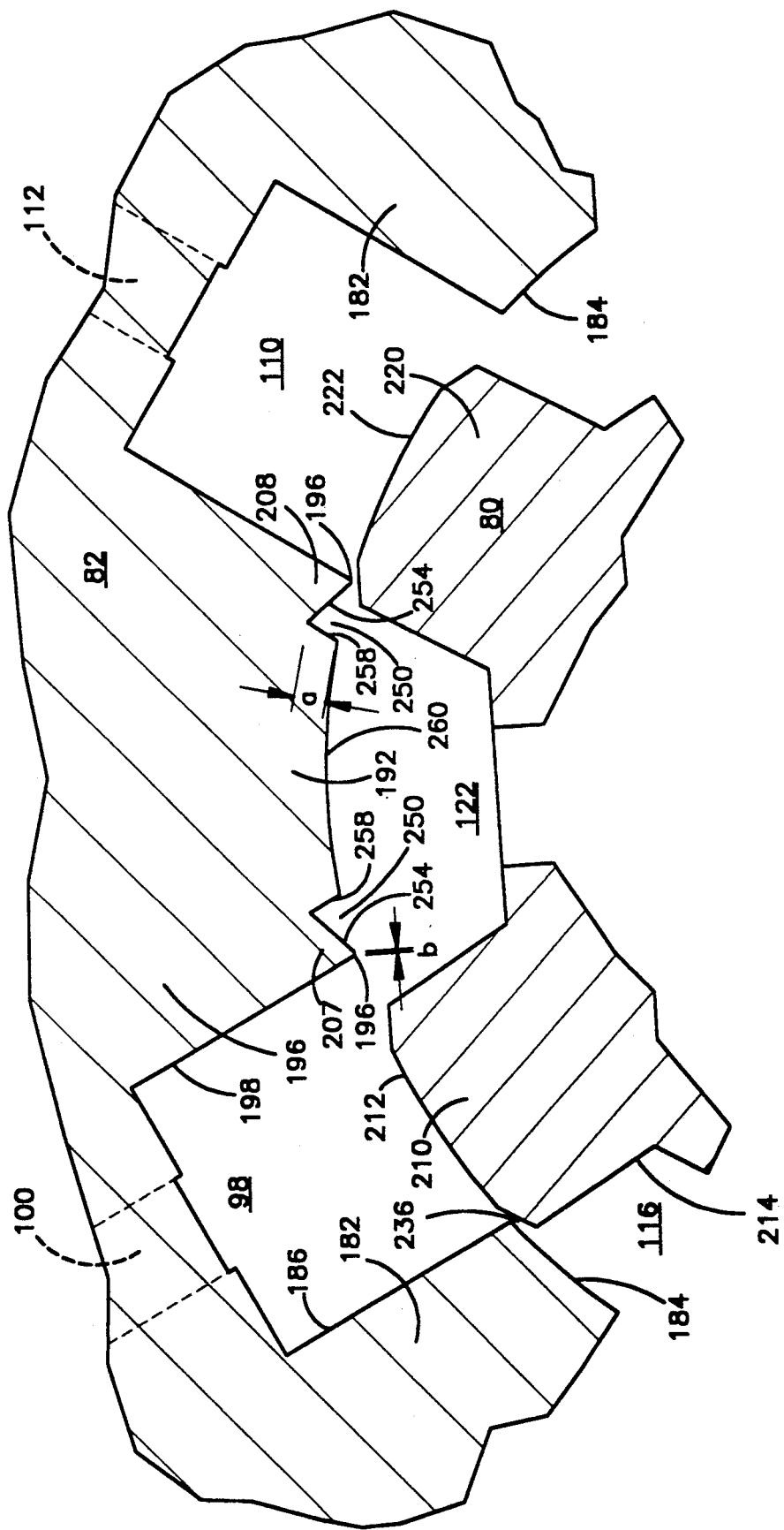
FIG. 5 is a view similar to FIG. 4, showing the surface profiles of valve members of a second embodiment of the invention.

In another embodiment of the invention (FIG. 5 wherein structure identical to that of the first embodiment is identified by the same reference numeral) the lands 192 each includes two axially extending notches 250. The notches 250 are positioned adjacent to the first and second corner portions 207 and 208 and adjacent to the end face surface segments 196. An axially extending end face surface segment 260 is located between the two notches 250. Each of the notches 250 is defined by axially extending sloped surfaces 254 and 258. Each notch 250 is substantially as long as the grooves 98 and 110. Each land 192 has a width which is much greater than the width of a respective one of said notches 250. Each notch 250 has a radial depth which is less than the radial depth of the grooves 98 and 110. During relative rotation of the valve core part 80 and the valve sleeve part 82, one of the end face surface segments 196 and one of the sloped surfaces 254 define a flow gap with either of the chamfered end faces 212 or 222. The minimum cross-sectional flow area of the particular flow gap will be defined by the one of the end face surface segments 196. The one of the sloped surfaces 254 provide an abrupt increase in the cross-sectional flow area.

From the above description of the invention, those skilled in the art will perceive improvements, changes and modifications. Such improvements, changes and modifications within the skill of the art are intended to be covered by the appended claims.

Having described the invention, the following is claimed:

1. A valve for controlling flow of hydraulic fluid, said valve comprising:
    a valve sleeve having a hollow interior; and
    a valve core disposed within the interior of said valve sleeve, said valve core and said valve sleeve being relatively rotatable about a common axis;
    said valve sleeve and said valve core each having an axially extending land and an axially extending groove, said lands each having an axially extending end face, said valve sleeve and said valve core having relatively rotated positions such that said land end faces overlap circumferentially and radially to define a flow gap having a cross-sectional flow are for flow of hydraulic fluid from said groove in said valve sleeve to said groove in said valve core, the flow gap having its minimum cross-sectional flow area immediately adjacent said groove in said valve sleeve for all relatively rotated positions of said valve core and said valve sleeve, a portion of said end face of said valve core being tapered such that the minimum cross-sectional flow area constantly varies as said valve core and said valve sleeve relatively rotate;
    said land on said valve sleeve having a notch located on said end face and immediately adjacent to and downstream of the minimum cross-sectional flow area for providing an abrupt increase in cross-sectional flow area immediately adjacent to and downstream of the minimum cross-sectional flow area for reducing valve noise.

2. A valve as set forth in claim 1, wherein an angle which subtends a surface segment of said notch and a surface segment of said end face of said land on said valve core which is radially aligned with said surface segment of said notch being greater than 12°.

3. A valve as set forth in claim 2, wherein said angle is greater than 45°.

4. A valve as set forth in claim 3, wherein said end faces have radially aligned end surface segments which define the minimum cross-sectional flow area, said end surface segment of said end face of said valve core tapers radially inward from a radial arc toward said radially aligned groove in said valve core, an angle which subtends said end surface segments which define the minimum cross-sectional flow area is less than 7°, an angle which subtends said end surface segment of said end face of said valve sleeve and said surface segment of said notch is greater than 45°, said notch extends the length of said groove in said valve sleeve.

5. A valve as set forth in claim 4, wherein the width of said land on said valve sleeve is slightly greater than the width of said notch.

6. A valve as set forth in claim 4, wherein the width of said land on said valve sleeve is much greater than the width of said notch.

7. A valve as set forth in claim 1, wherein said end faces have radially aligned end surface segments which define the minimum cross-sectional flow area for the relatively rotated positions of said valve sleeve and said valve core, an angle which subtends said radially aligned end said surface segments is less than 7°.

8. A valve as set forth in claim 7, wherein said notch extends the length of said groove in said valve sleeve.

9. A valve as set forth in claim 7, wherein the radial depth of said notch is much less than the radial depth of said groove in said valve sleeve.

10. A valve as set forth in claim 7, wherein said end surface segment on said end face of said valve sleeve has a width which is substantially smaller than the width of said lands, said grooves and said notch.

11. A valve as set forth in claim 1, wherein said end faces have radially aligned end surface segments which define the minimum cross-sectional flow area, said end surface segment of said land on said valve core tapers radially inward from a radial arc toward said groove in said valve core.

12. A valve for controlling flow of hydraulic fluid, said valve comprising:
    first and second relatively movable valve members each of said valve members having a land and a groove, said valve members have relative positions such that said lands overlap to define a flow gap having a cross-sectional flow area for variably restricting flow of hydraulic fluid from said groove in said first valve member to said groove in said second valve member;
    said land on said first valve member having a corner portion immediately adjacent said groove in said first valve member, said corner portion and said land on said second valve member defining a minimum cross-sectional flow area of the flow gap for the relative positions of said valve members, a portion of said end face of said valve core being tapered such that the minimum cross-sectional flow area constantly varies as said valve members relatively move, and
    said land on said first valve member having a notch immediately adjacent to and downstream of said corner portion for providing an abruptly increasing cross-sectional flow area of the flow gap to suppress cavitation noise of flow of hydraulic fluid from said groove in said first valve member to said groove in said second valve member.

13. A valve as set forth in claim 12, wherein said corner portion and said second valve member having radially aligned surface segments for the relative positions of said valve members, an angle which subtends said aligned surface segments being less than 7°.

14. A valve as set forth in claim 13, wherein an angle which subtends a surface segment of said notch and said surface segment of said corner portion being greater than 45°.

15. A valve as set forth in claim 12, wherein said corner portion having a surface segment extending adjacent to said land on said second valve member, said surface segment of said corner portion being nearer to said land on said second valve member than surfaces defining said notch for all relative positions of said first and second valve members.

16. A valve as set forth in claim 12, wherein said first valve member has a surface segment partially defining said groove and said land of said first member, said surface segment extending to partially define said corner portion.

17. A valve as set forth in claim 16, wherein the width of said notch is slightly less than the width of said land on said first valve member.

18. A valve as set forth in claim 16, wherein the width of said notch is much less than the width of said land of said first valve member.

19. A valve as set forth in claim 1, wherein said notch is at least partially radially aligned with said groove in said valve core for all relatively rotated positions of said valve core and said valve sleeve.

20. A valve as set forth in claim 12, wherein said notch at least partially overlaps said groove in said second valve member for all relative positions of said first and second valve members.

* * * * *

UNITED STATES PATENT AND TRADEMARK OFFICE
CERTIFICATE OF CORRECTION

PATENT NO. : 5,259,413

DATED : November 9, 1993

INVENTOR(S) : George M. Harpole, Hermann W. Behrens, Michael F. Wolff and
Jane M. Lin It is certified that error appears in the above-identified patent and that said Letters Patent is hereby corrected as shown below:

Column 7, line 42, change "are" to --area--.

Signed and Sealed this

Third Day of May, 1994

Attest:

BRUCE LEHMAN

Attesting Officer  Commissioner of Patents and Trademarks